3,119,881
IODINATIVE DEHYDROGENATION PROCESS

Russell L. Hodgson, Walnut Creek, Calif., assignor to Shell Oil Company, New York, N.Y., a corporation of Delaware
No Drawing. Filed Dec. 22, 1961, Ser. No. 161,362
8 Claims. (Cl. 260—673.5)

This invention relates to an improved process for the dehydrogenation of organic compounds. More particularly, it relates to iodinative dehydrogenation of hydrocarbons to form reactive hydrocarbons having a greater degree of unsaturation. The invention is concerned with improved means for recovering reactant iodine species from the aforesaid reactive unsaturated hydrocarbon product.

The art teaches various procedures for the dehydrogenation of organic compounds, including simple thermal dehydrogenation, catalytic dehydrogenation, and chemical reaction of agents which cleave carbon-to-hydrogen bonds thereafter combining with the hydrogen under the conditions of reaction, whereby stable inorganic atom-to-hydrogen bonds such as may be formed from oxygen, chlorine, and the like are produced. In some instances, where oxygen is used as the dehydrogenating agent, oxygenation of the organic residue accompanies the dehydrogenation as, for example, in reacting propylene with oxygen in the presence of a bismuth-molybdate catalyst to form acrolein.

Dehydrogenation of organic compounds by means of reacting them with iodine is now an established procedure in the patent literature. For example, U.S. Patent No. 2,880,249 to Raley et al., U.S. Patent 2,880,252 to Raley et al., U.S. Patent 2,890,253 to Mullineaux et al., U.S. Patent No. 2,901,518 to Raley et al., and U.S. Patent No. 2,901,520 to Raley exemplify processes employing iodinative dehydrogenation. The products therefrom, as has been already described, have higher carbon-to-hydrogen ratios than the feed materials. Moreover, it will be appreciated from the teachings of these patents that hydrogen iodide is produced from the hydrogen of the hydrocarbon and the iodine from the reactant iodine species. In particular, the art describes a class of reactions wherein an organic compound and a substantial portion of elemental iodine are reacted in vapor phase for a relatively short time at a temperature above about 300° C. Such dehydrogenation reactions include, for example, the conversion of paraffins to olefins and diolefins of olefins to diolefins, of certain paraffins to aromatics (dehydrocyclization) and other reactions in which organic compounds are converted to other compounds having a higher carbon-to-hydrogen ratio with a simultaneous conversion of iodine to hydrogen iodide. These reactions proceed generally with high efficiency at the preferred reaction conditions. The amount of elemental iodine which must be charged for the organic reactant may be materially reduced by reconverting some of the hydrogen iodide to elemental iodine while it is present in the reaction mixture at reaction conditions. For such purposes, it has been suggested that oxygen may be added, together with iodine, to the dehydrogenation reaction zone to convert hydrogen iodide to iodine and water. Such use of oxygen in the reaction zone is termed "in situ" regeneration and this process has been found especially useful in the dehydrogenation of aliphatic materials in general to more reactive dehydrogenated products having a higher carbon-to-hydrogen ratio with the corresponding degree of unsaturation thereto.

Moreover, the art describes the use of platinum in the process as a catalyst for the decomposition of hydrogen iodide formed in the dehydrogenation of the feed with consequent release of further amounts of iodine as a dehydrogenative reactant in the process. Such employment of metallic catalyst is particularly useful in making aromatic materials, especially in view of the fact that the reaction is more or less irreversible even in the presence of considerable amounts of hydrogen also released from the decomposition of the hydrogen iodide.

It has also been proposed (as in copending U.S. patent application Serial No. 74,844 of Baijle and Kwantes) to use certain metal oxides, hydroxides or carbonates, as for example, calcium oxide, as acceptors for the iodine of the hydrogen iodide formed during the dehydrogenation of the feed. When the metal oxide iodine acceptor is placed in the dehydrogenation zone, the equilibrium of the reaction is shifted due to the lowering of the concentration of hydrogen iodide by its reaction with the metal oxide. Certain metal oxides are useful in this role of acceptor for the iodine in that the resulting metal iodide can be reacted with oxygen with release of iodine for recycle to the reaction zone and formation of the metal oxide for further use as an acceptor. The reaction and regeneration may alternatively be carried out in the same vessel with in situ regeneration of the acceptor. However, such metal oxides, while being quite satisfactory for the recovery of iodine from the major portion of the hydrogen iodide in the reactor, permit loss of minor but significant amounts of iodine species unless suitable means for the recovery thereof is provided.

The problem of recovering iodine species from an iodinative dehydrogenation reaction is considerably complicated by the presence of reactive unsaturated product. Unless proper conditions and reagents are provided for the recovery of iodine species from such reactive product, the latter will become involved in undesirable further reactions such as, for example, halogenation, hydrohalogenation, oxidation, saturation, polymerization, or the like.

The present invention provides improved means for the recovery of iodine species from an iodinative dehydrogenation process and return to the reaction for further use. Moreover, the invention is directed to the recovery of iodine species from a mixture comprising substantial amounts of relatively reactive unsaturated hydrocarbon product.

Broadly speaking, the invention provides a particular material, namely, elemental copper, in the system to act as a scavenger for iodine species, particularly hydrogen iodide, organic iodides, and free iodine which otherwise would be lost from the system. The iodine is recovered from the resulting copper iodide and recycled for further iodinative dehydrogenation. Iodine is readily recovered by reacting the copper iodide with oxygen; the resulting copper oxide is readily reduced to elemental copper by a suitable reducing agent, such as hydrogen. The method of using copper in the invention will be described in the reference to the various systems for iodinative dehydrogenation which have been proposed.

An early process for the iodinative dehydrogenation of organic materials, and in particular hydrocarbons, comprises a 2-stage system including an iodinative dehydrogenation stage and an iodine recovery stage. In accordance with this process, organic feed, for purposes of example a hydrocarbon, oxygen and iodine are passed continuously to a reaction zone wherein dehydrogenation of the feed occurs along with the formation of hydrogen iodide according to the equation

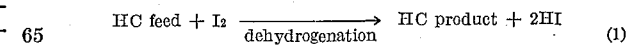

In the presence of oxygen in the reaction zone, as contemplated in this instance, at least a portion of the hydrogen iodide is reconverted to free iodine along with the formation of water, the reaction being represented as follows:

$$2HI + \tfrac{1}{2}O_2 \rightarrow H_2O + I_2 \qquad (2)$$

The reaction zone effluent, along with a certain amount of unreacted feed and iodine species, is transferred to a suitable recovery zone for separation of HC product and iodine species. In accordance with the present invention, copper is provided for recovery of the iodine species. By "iodine species" is meant those materials such as organic iodides, free iodine, and hydrogen iodide which readily give up iodine to form an iodide with the metallic copper:

$$\text{Organic iodide} + \text{Cu} \rightarrow \text{CuI} + \text{organic product} \quad (3a)$$
$$2\text{Cu} + 2\text{HI} \rightarrow 2\text{CuI} + \text{H}_2 \quad (3)$$
$$2\text{Cu} + \text{I}_2 \rightarrow 2\text{CuI} \quad (4)$$

The recovery of iodine by copper may be used in combination with the process described in copending application of Baijle et al., Serial No. 74,844, filed December 9, 1960.

According to the process described therein, a metal oxide, hydroxide or carbonate material which functions as an acceptor for hydrogen iodide may be provided in the dehydrogenation zone. Such acceptor may advantageously be present either as a solid or in molten state. When such an acceptor is present in the reaction zone, hydrocarbon feed, oxygen and iodine are introduced thereto in a manner similar to that already described with reference to Equation 1. The function of the acceptor, represented as the oxide of the metal, is shown by the equations:

$$\text{MO acceptor} + 2\text{HI} \rightarrow \text{MI}_2 + \text{H}_2\text{O} \quad (5)$$
$$\text{MI}_2 + \tfrac{1}{2}\text{O}_2 \rightarrow \text{MO} + \text{I}_2 \quad (6)$$

In order to recover the iodine in the effluent from the reaction zone, the effluent is passed into an iodine species recovery zone, wherein metallic copper is provided as scavenger in accordance with the present invention. The action of the metallic copper is represented by Equations 3a, 3 and 4, hereinbefore mentioned.

An alternative process for iodinative dehydrogenation of organic materials, principally hydrocarbons, as described in considerable detail in U.S. Patent No. 2,921,101 to Magovern, contemplates quenching the dehydrogenation reaction. The quenching is accomplished by lowering the temperature of the reaction effluent to a point that little or substantially no further dehydrogenation occurs and the rate of any reaction between HI and olefin is drastically reduced. Aqueous hydrogen iodide is especially useful as quenching medium in view of the fact that a constant boiling mixture is formed between HI and water (see U.S. Patent No. 2,833,700 to Baumgartner et al.), thereby enabling the ready recovery by distillation of excess HI dissolved by the quench liquid. As an alternative, aqueous caustic can be used to absorb the excess iodine species resulting in formation of the iodides of the alkali or alkaline earth metals used therein as hydroxides. This necessitates the added step of acidification to release iodine for further use in the reaction zone.

Following the aqueous quench, the product stream from the quench zone is fed to an iodine recovery zone wherein, in accordance with the invention, copper metal is provided as a scavenger for the remaining iodine species; the reaction again proceeds in accordance with the aforesaid Equations 3a, 3 and 4. It will of course be appreciated that the amount of iodine species recovered in the quench zone may in most cases be larger than that recovered through the scavenging action of the copper metal, although these relative amounts may vary within wide ranges depending in part on practical considerations. In this connection, it has been found that the scavenging action of metallic copper is particularly useful and advantageous in the recovery of relatively small amounts of iodine species as distinguished from principal amounts more economically handled in accordance with known processes.

As has been already described, the present invention broadly contemplates the provision of metallic copper in the over-all dehydrogenation system wherein it functions particularly well as a scavenger for iodine species. Accordingly, the invention also contemplates the use of metallic copper as a scavenger-acceptor in the reaction zone itself. Under certain conditions of reaction, it may be found of considerable advantage to so use copper, particularly since the affinity of the copper metal for iodine species is sufficient to prevent escape of valuable iodine from the system. The reactions occurring in accordance with this particular feature of the invention are illustrated by Equations 1, 3a, 3, and 4 set forth hereinbefore.

The employment of the copper metal in the reaction zone per se as scavenger-acceptor acts to shift the equilibrium of the dehydrogenation of the hydrocarbon feed. When copper metal is provided in the hydrogenation zone, provision is made for alternately subjecting it to the dehydrogenation operation and to regeneration. This may be done by having alternate reactors provided with a fixed mass of the copper and operating one reactor on dehydrogenation while the other is on regeneration. Alternatively, a fluidized mass of copper particles, supported or unsupported, may be passed continuously from regeneration zone to dehydrogenation zone, while fluidized copper iodide is passed from the dehydrogenation zone to the regeneration zone. The working out of the details of such procedures are considered within the skill of the art.

The invention is applicable in its broadest aspects to the dehydrogenation of many and varied organic materials, in particular, hydrocarbons. The organic materials must be iodine-reactive and convertible under appropriate conditions of reaction by contact with elemental iodine into more unsaturated reaction products.

Hydroaromatic alicyclic compounds can be converted to the corresponding aromatic compounds by dehydrogenation. Compounds containing an aliphatic chain of at least six non-quaternary carbon atoms can be converted to aromatics by dehydrocyclization, as can cyclic compounds having an aliphatic chain or aliphatic chains capable of closing a ring of six carbon atoms. Compounds having an aliphatic chain of two to five non-quaternary carbon atoms and compounds having a ring of five carbon atoms can be converted by dehydrogenation into compounds having a greater number of carbon-to-carbon double bonds. Certain more saturated compounds may also be converted to compounds having acetylenic triple bonds, e.g., ethane or ethene to acetylene. Compounds which have an aliphatic chain of at least five to four carbon atoms, including respectively, one or two quaternary carbon atoms and which have no chain of six non-quaternary carbon atoms are converted, by reaction including conversion of a quaternary to a non-quaternary carbon atom, into different compounds having the same carbon number as the feed, followed, if residence time is sufficient, by conversion of the latter compounds in accordance with their new structure, e.g., into aromatics.

The invention is, for example, particularly suitable for the following conversion reactions:

(1) Methane to ethylene and acetylene (by coupling).
(2) Ethane to ethylene and acetylene.
(3) Ethylene to acetylene.
(4) Propane to propylene, methylacetylene or allene.
(5) Propane to propylene to benzene (by coupling and cyclization).
(6) Aliphatic compounds having from four to five contiguous non-quaternary carbon atoms in a chain to the corresponding olefins and diolefins, and particularly conjugated diolefins. This includes the following conversions: n-butane to 1-butene, 2-butene and 1,3-butadiene; 1-butene or 2-butene to 1,3-butadiene; n-pentane to 1-pentene, 2-pentene and 1,3-pentadiene; 1-pentene or 2-pentene to 1,3-pentadiene; isopentane to 3-methyl-1-butene, 3-methyl-2-butene, 2-methyl-1-butene and isoprene.

(7) Aliphatic hydrocarbons having a chain of at least six contiguous non-quaternary carbon atoms and having from six to sixteen carbon atoms per molecule to aromatic hydrocarbons. This includes the folowing conversions: n-hexane to benzene; straight chain hexenes to benzene; n-heptane to toluene and a small amount of benzene; straight chain heptenes to toluene and a small amount of benzene; monomethylhexanes to toluene; monomethylhexenes to toluene; n-octane to aromatics predominating in ethylbenzene and ortho-xylene; straight chain octenes to aromatics predominating in ethylebenzene and ortho-xylenes; monomethylheptanes to monomethylheptenes to aromatics predominating in xylenes; dimethylhexanes (DMH) other than geminal, i.e., 2,3-DMH, 2,4-DMH, 2,5-DMH and 3,4-DMH, as well as corresponding monoolefins, to xylenes; thus: 2,3-DMH and 3,4-DMH give ortho-xylene; 2,4-DMH gives meta-xylene; and 2,5-DMH gives para-xylene; $C_{10}$ saturates such as n-decane and the like, and the corresponding olefins, to substituted monocyclic aromatics with predominantly saturated side chains. The following are illustrative: n-decane to n-butylbenzene, propyltoluene, diethylbenzene, propylbenzene, ethylbenzene, toluene and benzene plus some of the corresponding compounds with side chain unsaturation; 5-methylnonane to n-butylbenzene, propyltoluene, 1,4-dimethyl-2-ethylbenzene (2-ethyl-p-xylene), m-ethyltoluene, p-xylene and toluene plus some of the corresponding compounds with side chain unsaturation.

(8) Aliphatic hydrocarbons having from six to sixteen carbon atoms and having quaternary carbon atoms can also be converted to aromatics. Especially suitable are 2,2,4-trimethylpentane and 2,4,4-trimethylpentenes which are converted to xylenes, predominantly p-xylene.

(9) Non-hydroaromatic cycloparaffins and cycloolefins to corresponding cycloolefins and cyclodiolefins. For example: cyclopentane to cyclopentene and cyclopentadiene-1,3; methylcyclopentane to 1-methylcyclopentene, 3-methylcyclopentene, 4-methylcyclopentene, 1-methylcyclopentadiene-1,3, 2-methylcyclopentadiene-1,3, and 5-methylcyclopentadiene-1,3. Other methyl substituted cyclopentanes and cyclopentenes are similarly converted.

(10) Hydroaromatics to corresponding aromatics. For example: cyclohexane to benzene; methylcyclohexane to toluene; ethylcyclohexane to ethylbenzene; 1,2-dimethylcyclohexane to xylene; 1,3-dimethylcyclohexane to m-xylene; 1,4-dimethylcyclohexane to p-xylene.

(11) Aromatics with alkyl side chains of two or more carbon atoms, especially those with two to three carbon atoms in the chain, to aromatics having unsaturated side chains. For example: ethylbenzene to sytrene; n-propylbenzene to beta-methylstyrene; isopropylbenzene to alpha-methylstyrene.

(12) Suitable organic compounds may be treated according to the process of this invention. These include alcohols, halides, acids, nitriles, amines, ketones, esters, etc. Species exemplifying these are isopropyl alcohol, propionitrile, octadecyl amine, butyric acid, hexyl iodide, etc.

Although the reaction of hydrocarbons with iodine is highly selective, differences have been observed between various hydrocarbons, both in the rate of reaction and in the selectivity to a particular compound. Thus, the rate at which olefins are converted to compounds having a higher degree of unsaturation, either diolefins or other olefinic compounds or aromatics, is considerably greater, often by a factor of ten or more, than the rate of reaction of paraffins of the identical skeleton at otherwise equal conditions. It has also been found that the ideal length of the chain of contiguous non-quaternary carbon atoms in the aromatization of aliphatic compounds by dehydrocyclization is from six to seven carbon atoms for the most efficient conversion to aromatics. When longer chains are aromatized, the product contains not only aromatics of the same number of carbon atoms but also appreciable amounts of lower aromatics, formed by splitting off of short fragments, e.g., methyl or ethyl groups. Except for this latter effect of losing short fragments from aromatics, the reactions of the present invention are highly selective in producing a product having the same number of carbon atoms as the charge hydrocarbon. Thus, the present invention is not concerned with promotion of the cracking of hydrocarbons.

Of course, the dehydrogenation may be applied not only to single compounds but, more usually, to technical mixtures thereof. Reforming operations, involving various gasolines, are contemplated.

The feed charged to the reaction mixture may be a pure iodine-reactive hydrocarbon in admixture with an inert compound, as, for example, nitrogen or steam, which is not converted under the conditions of the invention.

The metallic copper suitable for use in the process of the invention may be in various forms as found most convenient in the particular embodiment wherein it is employed. For example, it may be in the form of metal sheets, chips, turnings, granules, or powder, and may, under certain circumstances, be supported upon an inert inorganic high-melting carrier, such as, for example, silica, or admixed with an inert solid. The chief consideration is in providing the copper substantially in the elemental form.

The process of the present invention readily lends itself to a fixed-bed cyclic operation or to a fluid-bed cyclic operation. Moreover, it will be found advantageous in some instances to provide the scavenger in the form of a fluidized circulating solid with movement between the particular zones of the process, as, for example, between the copper-iodine species reaction zone and the zone for regenerating the metallic copper for its further recirculation and use as scavenger. Copper iodide formed during the process may be regenerated by alternative means. One process comprises a manifold operation wherein regeneration to elemental copper and elemental iodine may be effected in, for example, one chamber while copper iodide is being formed through recovery of iodine from hydrogen iodide in another such chamber. Another procedure which possesses certain advantages involves the use of a fluidized solids system, and copper iodide formed in one zone of the recovery step is transferred to a further zone whereupon the copper iodide is converted to elemental copper and iodine, both of which are then recycled for reuse in their respective zones. Other systems for regenerating the copper iodide may be used as will be understood by those skilled in the art. Regeneration of the metallic copper and elemental iodine from the copper iodide may be effected by oxidation with an oxygen-containing gas followed by reduction of the resulting copper oxide by hydrogen and/or a reducing hydrocarbon gas, such as, for example, methane. Separated hydrogen resulting from the reaction of the copper with HI may be used for this reduction.

Through the use of metallic copper as a scavenger, the amount of iodine heretofore lost to the reaction is drastically reduced to the point wherein such previous loss now is no longer a serious problem in the iodinative dehydrogenation process. The amount of copper metal provided is dependent to a degree upon the type of reaction involved, whether it is used as sole or joint acceptor, and in particular on the amount of hydrogen cleavage which actually occurs with concomitant formation of hydrogen iodide, which latter is to be recovered. Other factors such as residence time of the effluent from the reactor in the recovery zone, the type of recovery system used, the temperatures and other conditions employed, etc., will determine the proper amounts of copper metal advantageously present. While there is no real upper limit as to the amount of copper metal which can be present in the recovery zone, such upper amounts are determined largely by such factors as ease of handling, contactor space available, scheduling of regeneration, and other factors which will be obvious to those skilled in the art. Moreover, the lower limit on the amount of copper is determined by that amount found to be effective and advantageous in conducting the particular reaction and iodine recovery attendant thereto under the conditions employed and in the apparatus utilized.

The following examples are offered for purposes of exposition and clarification of the invention and are not intended as limiting thereof except insofar as delineated by the spirit and scope of the appended claims.

Example I

Into a glass reaction tube 40 cm. long having a volume of 65 cc., 45 grams of copper turnings were placed, thereby occupying about two-thirds of the length of the reactor tube; such portion of the tube constituting the iodine recovery zone. The remaining approximate one-third of the reaction tube constituted the reaction zone. A vaporized mixture was passed through the glass reactor tube, such mixture comprising n-heptane at a feed rate of 0.072 gram/minute, iodine at a feed rate of 0.52 gram/minute (mole ratio of $I_2/C_7H_{16}$ being equal to 2.8), and helium diluent at a feed rate of 50 cc./minute. The temperature of the feed was about 250° C. upon admission to the reactor tube, wherein the temperature was maintained at 525° C. The residence time for the feed through the reactor tube was 9 seconds. The reaction was conducted for a period of 15 minutes and analysis showed a 66% conversion of n-heptane with a selectivity to toluene of 68% and to benzene of 14%. No iodine species escaped from the glass reactor tube during the process.

Example II

Into a glass reactor tube 40 cm. long having a volume of 80 cc., 20 grams of copper turnings were loosely placed, thereby filling the reactor which comprised both the reaction and the recovery zones. A vaporized mixture as in Example I was fed thereto with similar feed temperature and reactor tube temperature. In this instance, the residence time was 7 seconds. The reaction was conducted for a period of 5 minutes and analysis showed a 55% conversion of n-heptane with a selectivity to toluene of 74% and to benzene of 11%. All of the iodine species were again retained within the reactor.

Example III

The distal portion comprising about 100 cc. of a glass reaction tube 40 cm. long and having a volume of 200 cc. was filled with a mixture comprising about 50/50 of CaO and quartz chips. The remaining proximal portion was filled with quartz chips and maintained at a temperature of about 525° C. with the distal portion temperature being at about 400° C. A vaporized mixture at a temperature of about 250° C. upon admission and comprising n-hexane and 2-methylpentane in equimolar proportions at a feed rate of 0.09 gram/minute, iodine at a feed rate of 0.26 gram/minute for an iodine/hydrocarbon mole ratio of 1, and diluent nitrogen at a feed rate of 12.5 cc./minute was introduced into the proximal portion of the glass reactor tube and passed therethrough. The residence time in each portion of the reactor tube was 18 seconds. At the exit of the distal portion of the reactor tube was placed a scavenger tube 15 cm. long having a volume of 50 cc. and containing 64 grams of copper in the form of turnings and maintained at 400° C. The reaction was conducted for a period of 60 minutes and analysis showed a 46% conversion of n-hexane with a selectivity of 84% to benzene and a 48% conversion of 2-methylpentane. The traces of iodine species in the effluent from the distal portion of the glass reactor tube were recovered by the copper in the scavenger tube and after the reaction was discontinued 0.086 gram of iodine species, constituting all of the traces in the effluent, were collected and recovered.

Example IV

Iodinative dehydrogenation of ethane to ethylene is conducted in a circulating solid system comprising a reaction zone having a volume of about 215 cc. in conjunction with a regeneration zone having a volume of about 205 cc. Solid lithium iodide/lithium oxide supported on magnesia is contacted with ethane and free iodine in the reaction zone and ethylene product released therefrom into a scavenging zone having a volume of about 50 cc. The solid material supported on magnesia is circulated between the reaction zone and the regeneration zone and dilute oxygen used as regenerant for the release of the lithium iodide formed in the reaction zone whereby lithium iodide is converted largely to lithium oxide and free iodine, which latter materials are recycled to the reaction zone. Approximately 700 grams of lithium iodide and lithium oxide supported on magnesia are used in the process and function as acceptor for the recovery of iodine in the reaction zone. The ethane feed is processed at a rate of 154 cc./minute in the reaction zone and air is fed to the regeneration zone as regenerant therein at a rate of 500 cc./minute. The solid material is circulated by means of a flow of nitrogen at the rate of 350 cc./minute. The time in each zone for the vapor is about 3 seconds. A temperature of 575° C. is maintained in the regenerator and 625° C. in the reactor. The product effluent from the reaction zone containing ethylene also includes 0.14 gram of iodine per 100 grams of ethylene and 0.13 gram of HI per 100 grams of ethylene produced. The scavenger zone contains a bed of copper metal maintained at a temperature of about 400° C. and the iodine species are removed from the ethylene product effluent by means of such copper metal. The space velocity of ethylene effluent plus iodine species is about 1 liter/minute. Substantially all of the iodine species are removed by the copper metal scavenger and iodine-free product is withdrawn therefrom.

Example V n-Butane and iodine in a molar ratio of iodine to butane of 1.9 in vapor phase at a temperature of 400° C. is passed through a tubular Vycor reactor of 100 cm. in length and having a volume of 70 cc. The reaction temperature is maintained at 575° C. with a residence time of 1.5 seconds. The butane is 87% converted with a selectivity of butenes of 62% and to butadiene of 29%. The effluent gas from the reactor at reaction temperature is quenched with 10 volumes of steam at 120° C. and then neutralized with aqueous sodium hydroxide. Iodine species still present in the product stream following the steam quench are scavenged by passing the gases through a bed of metallic copper in a scavenging zone having a volume of 500 cc. and maintained at a temperature of about 400° C. The process is continued for 110 minutes and all of the iodine species in the effluent are scavenged from the stream.

Example VI

A manifolded operation whereupon 60 grams of 10%w copper metal on alumina were present in the iodinative dehydrogenation of methyl cyclopentane by reaction with iodine followed by regeneration was carried out. The copper iodide formed was regenerated initially by heating in a stream of oxygen and inert diluent, in this case nitrogen, to produce copper oxide and iodine with the iodine reused in the process; and then the copper oxide was heated in a hydrogen stream to regenerate copper metal. The oxygen removed the coke that had deposited on the copper and it was determined that the iodine species was retained by means of the copper metal in the system.

I claim as my invention:

1. In a process for the iodinative dehydrogenation of an organic compound by reacting said organic compound with elemental iodine to dehydrogenate said compound to a corresponding product having a higher carbon-to-hydrogen ratio and wherein hydrogen iodide is formed from hydrogen removed from said compound, the improvement of providing elemental copper in the system of the process for reaction with iodine species present and regenerating elemental iodine from resulting copper iodide for further use in the iodinative dehydrogenation.

2. Process in accordance with claim 1 wherein the regenerated elemental iodine is recycled to the process.

3. A process for the iodinative dehydrogenation of an organic compound wherein said organic compound is reacted with elemental iodine in a reaction zone to dehydrogenate said compound to a corresponding product having a higher carbon-to-hydrogen ratio and wherein hydrogen iodide is formed from hydrogen removed from said compound, and the effluent from said reaction zone is passed into a recovery zone, the improvement comprising providing elemental copper to said recovery zone to form copper iodide from said copper and at least some of the materials present in said effluent.

4. Process in accordance with claim 3 wherein copper metal and free iodine are formed from said copper iodide and wherein said copper metal is reused in said recovery zone and said free iodine is returned for reuse in said reaction zone.

5. In a process for the iodinative dehydrogenation of an organic compound wherein said organic compound is reacted with elemental iodine to dehydrogenate said compound to a corresponding product having higher carbon-to-hydrogen ratio and hydrogen iodide and wherein said product containing a minor amount of iodine species is separated as effluent from a major amount of iodine species, the improvement of contacting the effluent with elemental copper to remove last traces of iodine species in the effluent as copper iodide.

6. Process in accordance with claim 1 wherein said organic compound is a hydrocarbon.

7. Process in accordance with claim 1 wherein said organic compound is n-hexane and the product formed is benzene.

8. Process in accordance with claim 1 wherein said organic compound is butane and the product formed comprises butylenes and butadienes.

References Cited in the file of this patent

UNITED STATES PATENTS 2,898,386     Raley et al. _____ Aug. 4, 1959
2,921,013     Mullineaux et al. _____ Jan. 12, 1960